(12) United States Patent
Cabrini et al.

(10) Patent No.: US 7,602,776 B2
(45) Date of Patent: Oct. 13, 2009

(54) TIME DIVISION MULTIPLEXED LINK CONNECTIONS BETWEEN A SWITCHING MATRIX AND A PORT IN A NETWORK ELEMENT

(75) Inventors: Sergio Cabrini, San Giuliano Milanese (IT); Silvio Cucchi, Gaggiano (IT); Stefano Gastaldello, Teolo (IT); Giulio Gladiali, Milan (IT); Luca Razzetti, Sesto San Giovanni (IT)

(73) Assignee: Alcatel, Paris (FR)

( * ) Notice: Subject to any disclaimer, the term of this patent is extended or adjusted under 35 U.S.C. 154(b) by 615 days.

(21) Appl. No.: 11/061,640

(22) Filed: Feb. 22, 2005

(65) Prior Publication Data

US 2005/0232310 A1 Oct. 20, 2005

(30) Foreign Application Priority Data

Apr. 5, 2004 (EP) .................................. 04290904

(51) Int. Cl.
*H04Q 11/00* (2006.01)
(52) U.S. Cl. ..................... 370/387; 370/395.7; 370/429
(58) Field of Classification Search ......... 370/369–376, 370/378, 380, 386–388, 389, 390, 429, 430, 370/474, 395.7; 398/140, 56
See application file for complete search history.

(56) References Cited

U.S. PATENT DOCUMENTS

| | | | | |
|---|---|---|---|---|
| 5,579,310 A | * | 11/1996 | Heiles et al. ................. 370/389 |
| 5,615,211 A | * | 3/1997 | Santore et al. ............... 370/419 |
| 6,064,670 A | * | 5/2000 | Athenes et al. .............. 370/375 |
| 6,628,650 B1 | * | 9/2003 | Saito et al. ................... 370/369 |
| 6,693,904 B1 | | 2/2004 | McKenzie et al. |
| 6,785,270 B1 | * | 8/2004 | Parrish et al. ................ 370/369 |
| 7,023,841 B2 | * | 4/2006 | Dell et al. .................... 370/388 |
| 7,099,583 B2 | * | 8/2006 | Schafer et al. ................. 398/56 |
| 7,130,276 B2 | * | 10/2006 | Chen et al. ................... 370/249 |
| 7,227,861 B2 | * | 6/2007 | Tomonaga et al. .......... 370/386 |
| 7,447,199 B2 | * | 11/2008 | Cucchi et al. ................ 370/386 |
| 2001/0022786 A1 | * | 9/2001 | King et al. ................... 370/412 |
| 2004/0008674 A1 | * | 1/2004 | Dubois ........................ 370/388 |
| 2004/0105451 A1 | * | 6/2004 | Boduch et al. ............... 370/401 |
| 2004/0151195 A1 | * | 8/2004 | Donoghue et al. ........... 370/412 |
| 2007/0110059 A1 | * | 5/2007 | Spires et al. ................. 370/389 |

FOREIGN PATENT DOCUMENTS

| | | |
|---|---|---|
| GB | 2 364 470 A | 1/2002 |
| WO | WO 02/15489 A2 | 2/2002 |
| WO | WO 02/052788 A2 | 7/2002 |

\* cited by examiner

*Primary Examiner*—Kwang B Yao
*Assistant Examiner*—Jeffrey M Rutkowski
(74) *Attorney, Agent, or Firm*—Sughrue Mion, PLLC

(57) ABSTRACT

Disclosed is an input port to one or more switching matrices of a network element or the like through a number of backpanel connections, the port receiving input flows in the form of bits arranged in frames, the port comprising: a memory for storing a number of bytes belonging to a tributary; a slicer for slicing the stored bytes in a number of word structures and a backpanel framer for forming backpanel frames with said word structures, the number of said word structures being equal to the number of said switching matrices and the capacity of the input flow being equal to the capacity of the overall backpanel connection capacity.

15 Claims, 5 Drawing Sheets

TIME DIVISION MULTIPLEXED LINK CONNECTIONS BETWEEN A SWITCHING MATRIX AND A PORT IN A NETWORK ELEMENT

BACKGROUND OF THE INVENTION

1. Field of the Invention

The present invention relates to telecommunication network elements, typically ADMs (Add/Drop Multiplexers) or DXC (Digital Cross-connects). In particular, the present invention relates to a port device for connecting input flows to a switching matrix (also known as switching fabric) and a method for providing a plurality of input flows to a switching matrix in a network element. Furthermore, the present invention relates to a backpanel frame for transmitting input flows to a switching matrix.

2. Description of the Prior Art

As it is known, an ADM is a network element that provides access to all, or some subsets, of the constituent signals contained within an STM-N. The constituent signals are added to or dropped from the STM-N signal as it passes through the ADM.

Digital cross-connect systems are commonly employed to controllably rearrange and redirect the contents of signals being communicated in digital transmission systems. However, with ever increasing demands for larger transmission capacity, there is a need for increasingly larger capacity non-blocking switch units used in the cross-connect switching fabric. In particular, there is the need to provide a fabric switch whose capacity can be easily varied.

In network elements, input flows are received at ports and sent to a switching matrix through backpanel connections. After a cross-connection is carried out at such a switching matrix, the properly cross-connected data are sent to output ports.

Several different arrangements are known for providing a switching matrix with data from a port. Unfortunately, prior art solutions are focused on specific applications, for instance for transporting only SONET or SDH or OTN payload. Furthermore, the known arrangements are typically derived from standard frame formats and thus they are not optimized for efficient, flexible, agnostic and scalable architectures.

SUMMARY OF THE INVENTION

The Applicant has felt the need to provide an agnostic arrangement having the capability to cross-connect both High Order SONET/SDH tributaries and ODUx tributaries.

The Applicant has also felt the need to provide an arrangement allowing a scalable "word slice" approach maximizing the matrix capacity and minimizing complexity and power dissipation of the switching matrix.

In addition, the Applicant has felt the need to provide a link protection between port and switching matrix.

These and further objects are obtained by the port, the method and the frame according to claim 1, 7 and 13, respectively. Further advantageous features are set forth in the dependent claims. All the claims are deemed to be an integral part of the present description.

According to a first aspect, the present invention provides an input port to a number of switching matrices of a network element or the like through a number of backpanel connections, the port receiving input flows in the form of bits arranged in frames, the port comprising: a memory for storing a number of bytes belonging to a tributary; a slicer for slicing the stored bytes in a number of word structures and a backpanel framer for forming backpanel frames with said word structures, the number of said word structures being equal to the number of said switching matrices and the capacity of the input flow being equal to the capacity of the overall backpanel connection capacity.

Profitably, each of said backpanel frame comprises an overhead section and a payload section, the overhead section including a plurality of words and redundant data, the payload section including a plurality of words with redundant data.

According to one embodiment, said redundant data provide a forward error correction protection feature.

According to one preferred embodiment, eight bytes of one tributary are stored in the port memory, said eight bytes being arranged into four 2-bytes structures (four words) that are provided to four switching matrices through said backpanel connections. Preferably, the port memory does not store all said eight bytes, but transmits two bytes to each of the four matrices in a round robin fashion as soon as said two bytes are available.

Preferably, said switching matrices are time division multiplex (TDM) matrices.

According to a second aspect, the present invention provides a method for feeding a number of switching matrices of a network element or the like through a number of backpanel connections, the method comprising the steps of receiving input flows in the form of bits arranged in frames, storing a number of bytes belonging to a tributary; slicing the stored bytes in a number of word structures and forming backpanel frames with said word structures, the number of said word structures being equal to the number of said switching matrices and the capacity of the input flow being equal to the capacity of the overall backpanel connection capacity.

Profitably, the step of forming backpanel frames comprises the steps of providing an overhead section and a payload section, the overhead section including a plurality of words and redundant data, the payload section including a plurality of words with redundant data.

According to one embodiment, said redundant data provide a forward error correction protection feature.

According to one preferred embodiment, eight bytes of one tributary are stored in the port memory, said eight bytes being arranged into four 2-bytes structures (four words) that are provided to four switching matrices through said backpanel connections. Preferably, the port memory does not store all said eight bytes, but transmits two bytes to each of the four matrices in a round robin fashion as soon as said two bytes are available.

Preferably, said switching matrices are time division multiplex (TDM) matrices.

According to a third aspect, the present invention provides a backpanel frame structure for connecting at least one port to at least one switching matrix in a network element, the frame structure comprising an overhead section and a payload section, the overhead section including a plurality of words and redundant data, the payload section including a plurality of words with redundant data.

According to one embodiment, said redundant data provide a forward error correction protection feature.

The present invention will become clear after reading the following detailed description, to be read with reference to the attached drawings.

BEST MODE FOR CARRYING OUT THE INVENTION

Figure 1:
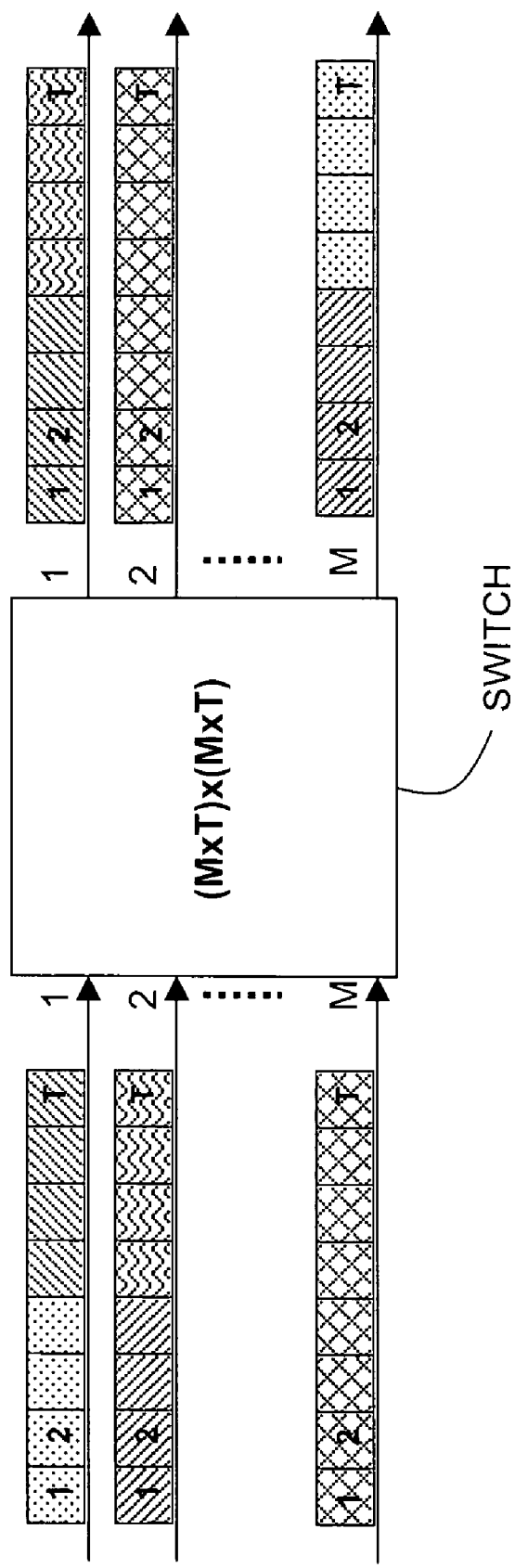
FIG. 1 shows a single square switching matrix cross-connecting M flows, with each flow comprising T time slots.

With reference first to FIG. 1, an elementary square TDM matrix is shown and designed as SWITCH. The matrix of FIG. 1 comprises M input links, each link carrying T time slots. The cross connection capability is N×N, where N=M× T. Let's call C the capacity of each time slot in Mbit/s: the overall capacity of the elementary matrix of FIG. 1 is then N×C.

By mapping a tributary in one or more time slots, it is possible to use the matrix of FIG. 1 for different tributary bit rates. The number $N_t$ of time slots required for each tributary is $N_t=\lceil f_T/C \rceil$, where $f_T$ is the tributary bit rate.

Figure 2:
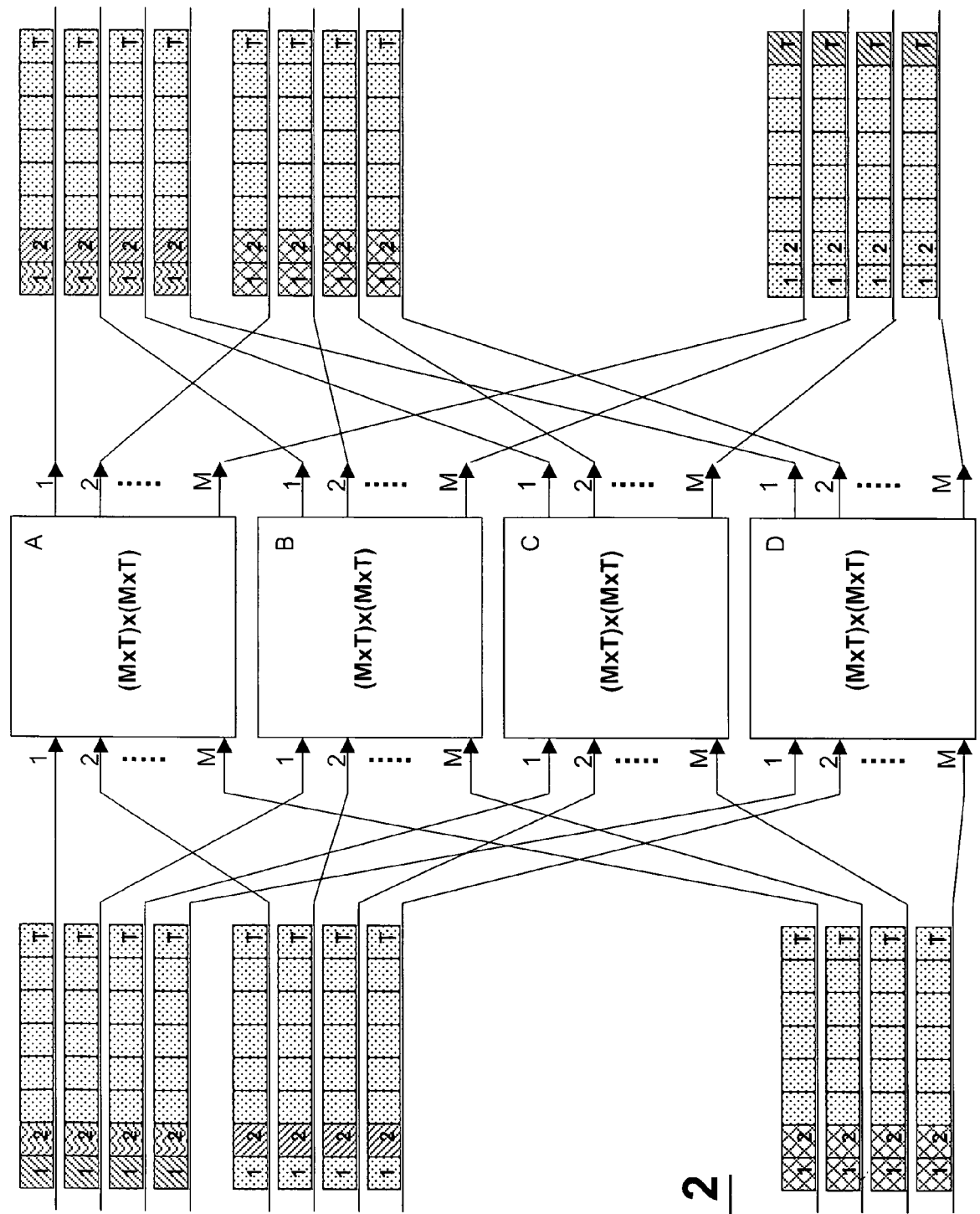
FIG. 2 shows an arrangement of four square switching matrices cross-connecting 4×M flows, with each flow comprising T time slots.

The Applicant has followed this novel approach for providing a higher capacity matrix arrangement. The basic idea consists in using multiple elementary TDM matrices in parallel. With k matrices in parallel the cross connection capability still is N×N but the capacity of the single equivalent time slot (made of k elementary time slots in parallel) is $C_k$=C×k. Each time slot is distributed through the k elementary matrices, and the tributaries are switched by the k matrices working in parallel. As an example, FIG. 2 shows four switching matrices (k=4), designed A, B, C and D, respectively.

To exploit the flexibility of this kind of novel approach, a particular backpanel frame structure has been defined for the link between ports and matrices. In particular the port according to the present invention is connected to all the elementary matrices used in a specific configuration, through a link simply composed by an ordered structure of time slots handled by the matrix, plus some overhead for link management and communication between port and matrix. A first embodiment of backpanel frame according to the present invention is shown in FIG. 3.

Figure 3:
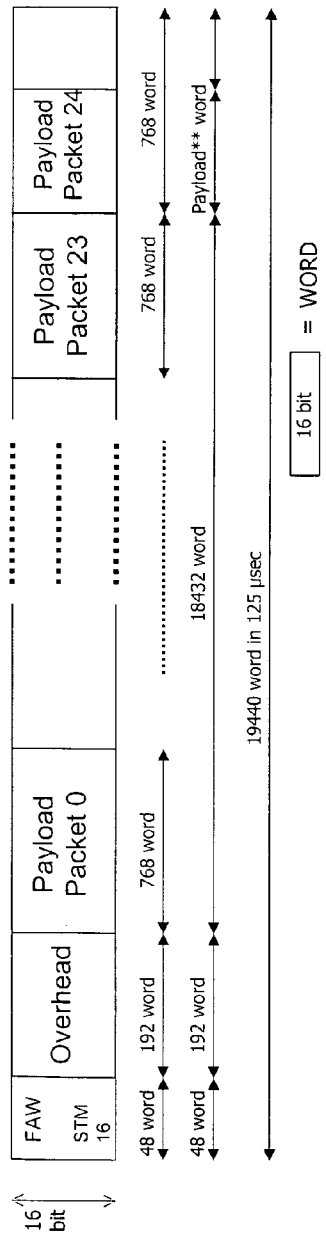
FIG. 3 shows a first embodiment of backpanel frame according to the present invention.

The frame according to FIG. 3 is an 8 KHz frame with an overall frequency of 2,48832 Gbit/sec (equivalent to an STM-16 or OC-48 bit rate) transporting a synchronous transmission payload, typically SDH or SONET (AU4 or AU3). The backpanel frame of FIG. 3 comprises a first portion with a frame alignment word (FAW), an overhead and a number of payload packets. In the embodiment of FIG. 3, each word comprises 16 bits, namely two bytes. The frame alignment word comprises 48 words, the overhead comprises 192 words and each payload packet comprises 768 words (equivalent to 768 time slots); there are 25 of such packets.

As the capacity of each time slot (each word in a packet) is C=8000×25×16 bit/s=3.2 Mb/s, it is possible to accommodate one AU3 ($f_{AU3}$=50.304 Mb/s) in 16 time slots, as $C_{16}$=16×3.2 Mb/s=51.2 Mb/s. In this case, it is possible to built an AU3 switch with up to 16 matrices working in parallel, each one handling one of the 16 time slots; the resulting system is able to switch up to M×768 AU3. Similarly, it is possible to build a system with (1) 2, 4, 8 matrices working in parallel, each one respectively handling (16) 8, 4, 2 time slots of a single AU3. The resulting systems will be able to switch respectively up to (M×48) M×96, M×192, M×384 AU3.

An AU4 is simply transported using three times the slots necessary for an AU3. The same applies for higher bit-rates tributaries. It is convenient to synchronize the SDH/SONET tributaries to the backpanel frame: this can be achieved with pointer processing, putting an SDH/SONET Section adaptation function on the port; moreover, as $C_{16}>f_{AU3}$, some bits in the time slots will contain fixed stuffing.

Figure 4:
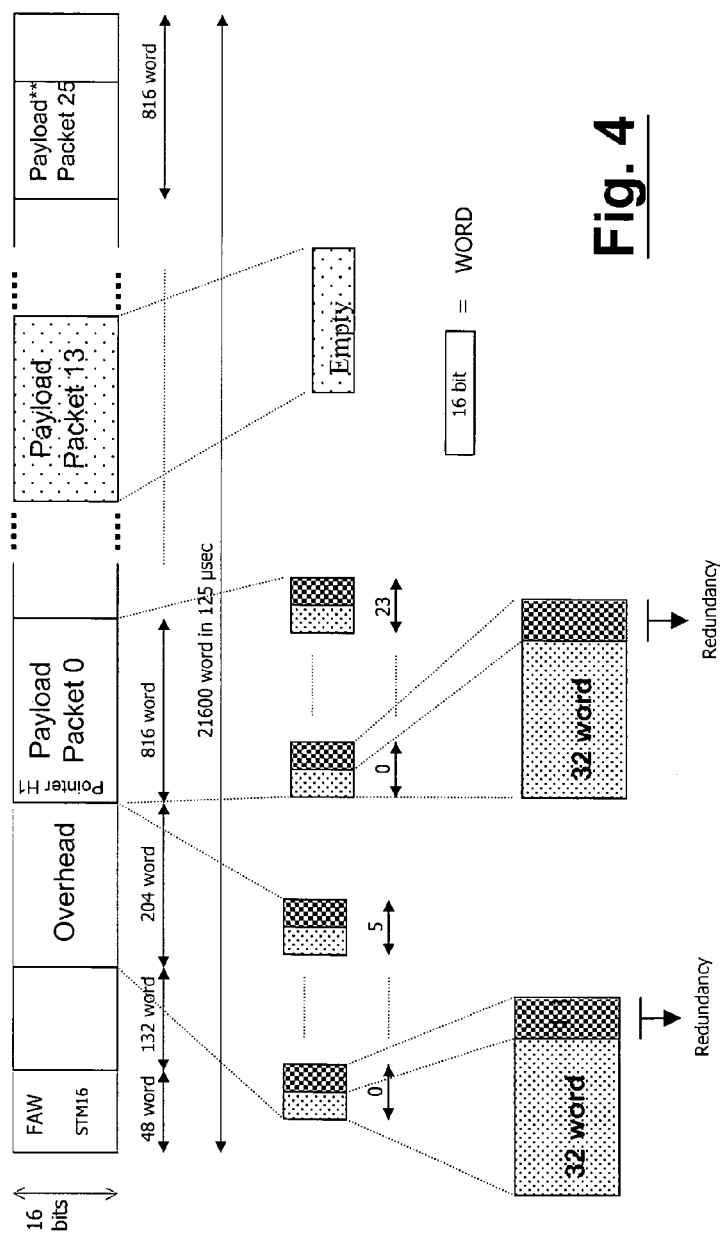
FIG. 4 shows a second embodiment of backpanel frame according to the present invention.

The frame according to FIG. 4 is a 2,7648 Gbit/sec frame (8 KHz periodicity) transporting a synchronous transmission payload, typically SDH or SONET. The backpanel frame of FIG. 4 comprises a first portion with a frame alignment word (FAW), a stuffing portion, an overhead and a number of payload packets. In the embodiment of FIG. 4, each word comprises 16 bits, namely two bytes. The frame alignment word comprises 48 words, the overhead comprises 204 words and each payload packet comprises 816 words. Between FAW and overhead, some stuffing is provided. In the shown embodiment, the stuffing comprises 132 words.

As it is clear from FIG. 4, both the overhead and payload sections comprise a plurality of words and each word has redundant data providing forward error correction features. In this way, the link between Port and Matrix becomes protected in order to enable the use of a big number of High Speed links with very dense boards layout. The FEC algorithm and frame structure could be designed in order to provide an adequate coding gain and minimize the complexity of FEC encoder and decoder. The $13^{rd}$ payload packet is empty (i.e. contains stuffing data) when the frame is carrying SDH/SONET payload: in this case the capacity of each time slot is still C=8000×25× 16 bit/s=3.2 Mb/s. As a consequence, the mapping of AU4 and AU3 in this case is identical to the one defined for the 2,48832 Gbit/sec frame.

Figure 5:
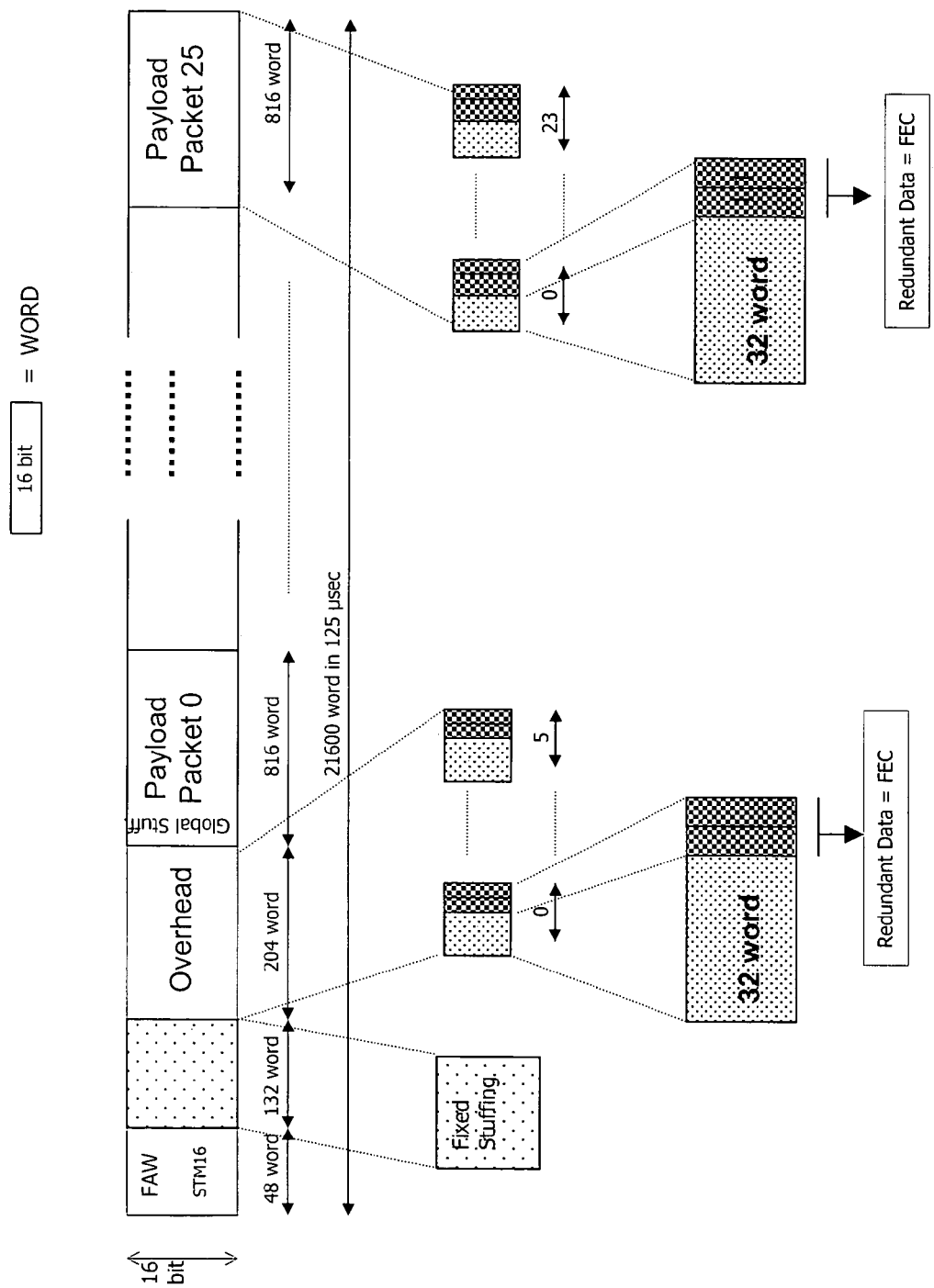
FIG. 5 shows a third embodiment of backpanel frame according to the present invention.

The frame according to FIG. 5 is a 2,7648 Gbit/sec frame (8 KHz periodicity) transporting ODU tributaries (OTN payload).

The backpanel frame of FIG. 5 comprises a first portion with a frame alignment word (FAW), a stuffing portion, an overhead and a number of payload packets. In the embodiment of FIG. 5, each word comprises 16 bits, namely two bytes. The frame alignment word comprises 48 words, the overhead comprises 204 words and each payload packet comprises 816 words. Between FAW and overhead, some stuffing is provided. In the shown embodiment, the stuffing comprises 132 words.

As it is clear from FIG. 5, both the overhead and payload sections comprise a plurality of words and each word has redundant data providing forward error correction features. In this way, the link between Port and Matrix becomes protected in order to enable the use of a big number of High Speed links with very dense boards layout. The FEC algorithm and frame structure could be designed in order to provide an adequate coding gain and minimize the complexity of FEC encoder and decoder.

In this case all the payload packets can be filled with payload: the capacity of each time slot is increased up to C=8000×26×16 bit/s=3.328 Mb/s. This allows for a mapping of one ODU1 in 16×48=768 time slots, a mapping of one ODU2 in 16×192=3072 time slots, and a mapping of an ODU3 in 16×768=12288 time slots. As the ODUx tributary cannot be synchronized to the 8 KHz backpanel frame, a convenient plesiochronous mapping method must be defined for this case, e.g. using a proprietary positive stuffing mapping.

An alternative to FIG. 5 backpanel frame could be to define a frame with a time slot capacity of C=8000×25×16 bit/s=3.2

Mb/s (the same as for the frame in FIG. 3), but inserting in the frame a higher number of timeslots, for instance 800. In this case the mapping of one ODU1 can be achieved using 16×50=800 time slots, the mapping of one ODU2 using 16×200=3200 time slots, and the mapping of an ODU3 using 16×800=12800 time slots. As the ODUx tributary cannot be synchronized to the 8 KHz backpanel frame, a convenient plesiochronous mapping method must be defined for this case, e.g. using a proprietary positive stuffing mapping. The port according to the present invention, according to the tributary capacity and the number of parallel elementary matrices, manages the mapping of one tributary in the time slots inside each link. The elementary matrix itself has not to know the payload content of the frames received as input flows and it is thus agnostic.

Figure 6:
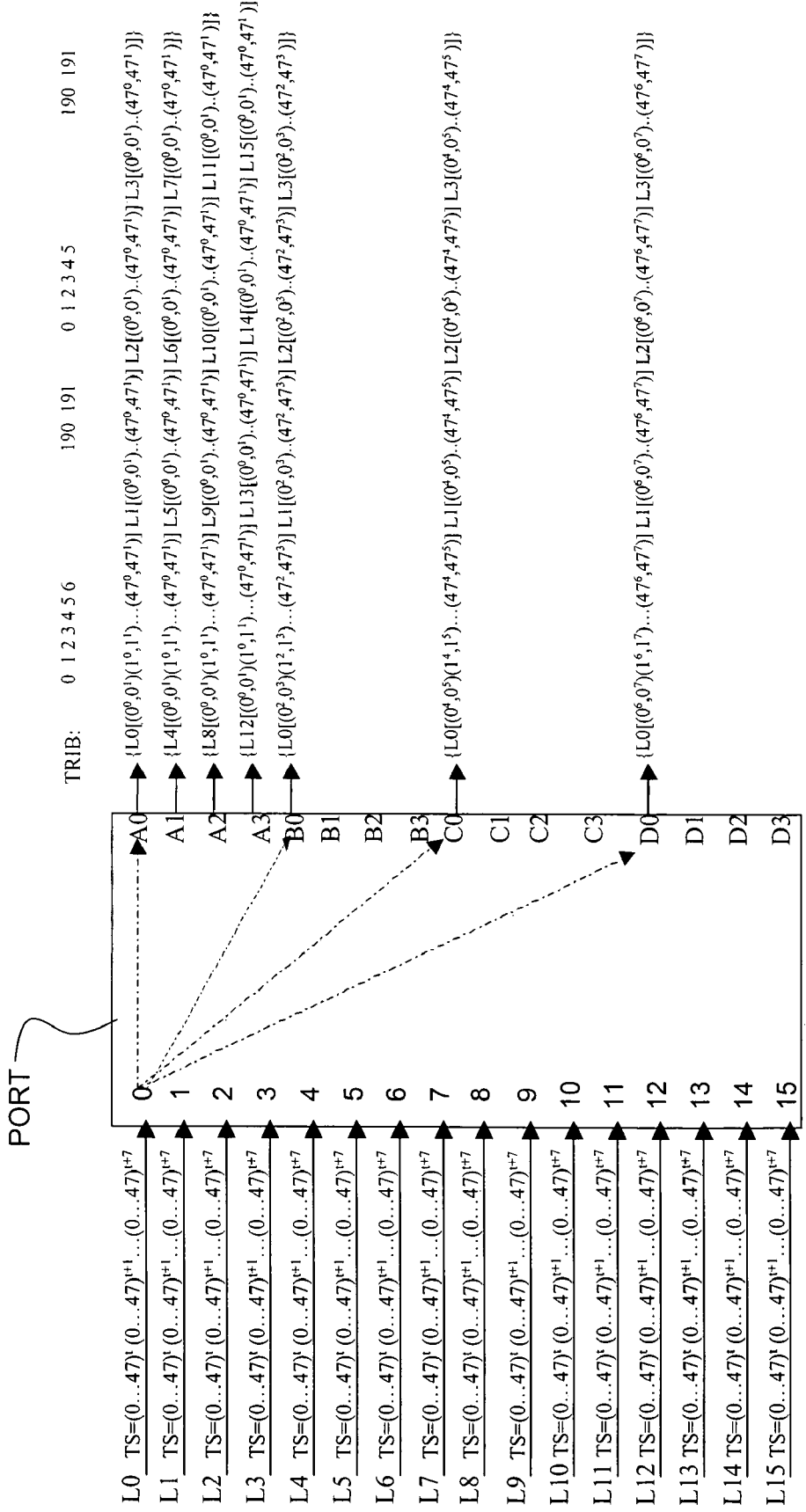
FIG. 6 diagrammatically shows an input port according to one embodiment of the present invention.

In FIG. 6 the operation of a port (PORT) according to one embodiment of the present invention is shown. In particular, the slicing step is shown for the case of a 16×STM16/OC48 receiving port. The port receives sixteen input flows (L0, L1, L2, . . . , L15) with STM16/OC48 frame format. For each AU-3 tributary, eight bytes are collected and stored in a memory. The number of AU-3 tributaries inside an STM 16 is 48 (0 . . . 47); t=0 stands for the first arrived byte of a tributary and, analogously, t+1 stands for the second arrived byte, and so on up to the last arrived byte (t+7). It is supposed that the port of FIG. 6 is connected to four switching matrices (A, B, C, D, not shown), through four backpanel connections for each matrix, numbered 0 to 3.

As it is shown in FIG. 6, the eight bytes of each tributary received at each input link are sliced so that four equal structures are fed to the four switching matrices. For instance, the tributaries of the first input link L0 are sliced and arranged in four different frames. The first frame (A0, sent to matrix A) comprises $L0[0^0,0^1)(1^0,1^1) \ldots (47^0,47^1)]$, wherein:

$0^0$: first received byte of AU3 number 0;
$0^1$: second received byte of AU3 number 0;
$1^0$: first received byte of AU3 number 1;
$1^1$: second received byte of AU3 number 1;
$47^0$: first received byte of AU3 number 47;
$47^1$: second received byte of AU3 number 47; and, more in general,
$j^i$: (i+1)-th received byte of j-th AU3

The second frame (B0, sent to matrix B) comprises $L0[0^2, 0^3)(1^2,1^3) \ldots (47^2,47^3)]$, wherein:

$0^2$: third received byte of AU3 number 0;
$0^3$: fourth received byte of AU3 number 0; and so on.

The third frame (C0, sent to matrix C) comprises $L0[0^4, 0^5)(1^4,1^5) \ldots (47^4,47^5)]$, wherein:

$0^4$: fifth received byte of AU3 number 0;
$0^5$: sixth received byte of AU3 number 0; and so on.

And, finally, the fourth frame (D0, sent to matrix D) comprises $L0[0^6,0^7)(1^6,1^7) \ldots (47^6,47^7)]$, wherein:

$0^6$: seventh received byte of AU3 number 0;
$0^7$: eighth received byte of AU3 number 0; and so on.

The same criteria is adopted for the other fifteen input links L1 to L15).

It is possible to avoid storing eight bytes for each tributary before starting the transmission of payload towards the four matrices: as soon as two bytes are stored, they are transmitted towards one of the four matrices, in round robin fashion; this results in having the four links towards the four matrices which are slightly delayed from matrix number 1 (the first served) to matrix number four (the last served). The matrices operate with this relative delay, and the delay is absorbed in the de-slice process (the one which reconstructs the original AU3 after the cross-connection).

It will be realized that the present invention fundamentally consists in organizing received data in a proper frame format (comprising payload and overhead) coming from the line framer to the Matrix switches. At least the following objectives are reached by the present invention:

It is obtained an agnostic architecture having the capability to cross-connect both High Order SONET/SDH tributaries and ODUx tributaries (and possibly any payload that can be accommodated in a number of time slots).

It is allowed a scalable "word slice" approach maximizing Matrix capacity and minimizing complexity and power dissipation for Matrix switch.

Finally, the link between Port and Matrix becomes protected by a FEC in order to enable the use of a large number of High Speed links with very dense boards layout. The FEC algorithm and frame structure are studied in order to provide an adequate coding gain and minimize the complexity of FEC encoder and decoder.

The solution according to the present invention is extremely flexible. In fact, the matrix is payload agnostic, and it simply switches time slots. Furthermore, it is very easy adding specific ports to the system in order to obtain an equipment able to cross-connect at the same time every type of TDM traffic (e.g. SDH, SONET, OTH . . . ).

Moreover the system is easily scalable thanks to the word-slice approach.

The backpanel links provide built-in communication channels between ports and matrix (useful for system maintenance and traffic overhead handling).

Profitably, the port and the matrix are ASIC implemented.

Whilst only input ports have been described, it is clear that output ports will operate fundamentally in a mirrored manner.

We claim:

1. A network element comprising:
an input port and
a plurality of time division multiplex switching matrices, said input port being connected to said switching matrices through at least one backpanel connection,
wherein the input port receives a plurality of input flows, each said input flow in the form of bits arranged in frames, wherein each frame comprises at least one tributary,
wherein the input port comprises:
a memory for storing a predetermined number of bytes for each tributary;
a slicer for slicing the stored predetermined number of bytes for each tributary into a plurality of word structures; and
a backpanel framer for forming backpanel frames with said word structures,
wherein the number of said word structures for each tributary is equal to the number of said switching matrices;
wherein the capacity of the input flow being equal to the capacity of the overall backpanel connection capacity; and
wherein each backpanel frame comprises, for a number of input flows equal to the number of switching matrices, a corresponding word structure of the tributaries.

2. The network element according to claim 1, wherein each of said backpanel frame comprises an overhead section and a payload section, the overhead section including a plurality of words and redundant data, the payload section including a plurality of words with redundant data.

3. The network element according to claim 2, wherein said redundant data provide a forward error correction protection feature.

4. The network element according to claim 1, wherein eight bytes of one tributary are stored in the port memory, said eight bytes being arranged into four 2-bytes structures of four words each that are provided to four switching matrices through said backpanel connections.

5. The network element according to claim 1, wherein the switching matrices are ASIC implemented.

6. The network element according to claim 1, wherein said input port further comprises at least one input link, wherein each of the at least one input link is connected to the number of said switching matrices and wherein the respective input link uses the number of switching matrices in parallel.

7. The network element according to claim 1, wherein the number of switching matrices switch in parallel from a single input link.

8. The network element according to claim 1, wherein the slicer adjusts the slicing of the stored bytes in the number of word structures depending on format of an application that produces the tributary and the number of switching matrices.

9. The network element according to claim 8, wherein the format of the application is one of SONET/SDH and ODUx.

10. A method for feeding a plurality of time division multiplex switching matrices of a network element through a number of backpanel connections, the method comprising:
   receiving a plurality of input flows, wherein each said input flow is in the form of bits arranged in frames, wherein each frame comprises at least one tributary;
   storing, in a tangible computer readable medium comprised by said network element, a predetermined number of bytes for each tributary;
   slicing the stored predetermined number of bytes for each tributary into a plurality of word structures; and
   forming backpanel frames with said word structures,
   wherein said slicing comprises forming said word structures in a number which is equal to the number of said switching matrices;
   wherein the capacity of the input flow is equal to the capacity of the overall backpanel connection capacity; and
   wherein each backpanel frame comprises, for a number of input flows equal to the number of switching matrices, a corresponding word structure of the tributaries.

11. The method according to claim 10, wherein the step of forming backpanel frames comprises the steps of providing an overhead section and a payload section, the overhead section including a plurality of words and redundant data, the payload section including a plurality of words with redundant data.

12. The method according to claim 11, wherein said redundant data provide a forward error correction protection feature.

13. The method according to claim 10, wherein eight bytes of one tributary are stored in the port memory, said eight bytes being arranged into four 2-bytes structures of four words each that are provided to four switching matrices through said backpanel connections.

14. The method according to claim 10, wherein said switching matrices are time division multiplex matrices.

15. The method according to claim 10, wherein said one or more matrices are ASIC implemented.

* * * * *

UNITED STATES PATENT AND TRADEMARK OFFICE
CERTIFICATE OF CORRECTION

PATENT NO. : 7,602,776 B2  Page 1 of 1
APPLICATION NO. : 11/061640
DATED : October 13, 2009
INVENTOR(S) : Cabrini et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1214 days.

Signed and Sealed this

Fifth Day of October, 2010

David J. Kappos
*Director of the United States Patent and Trademark Office*